E. F. ALTMAN.
SPROCKET CHAIN HOUSING.
APPLICATION FILED JULY 24, 1913.
1,113,148.
Patented Oct. 6, 1914.
2 SHEETS—SHEET 1.
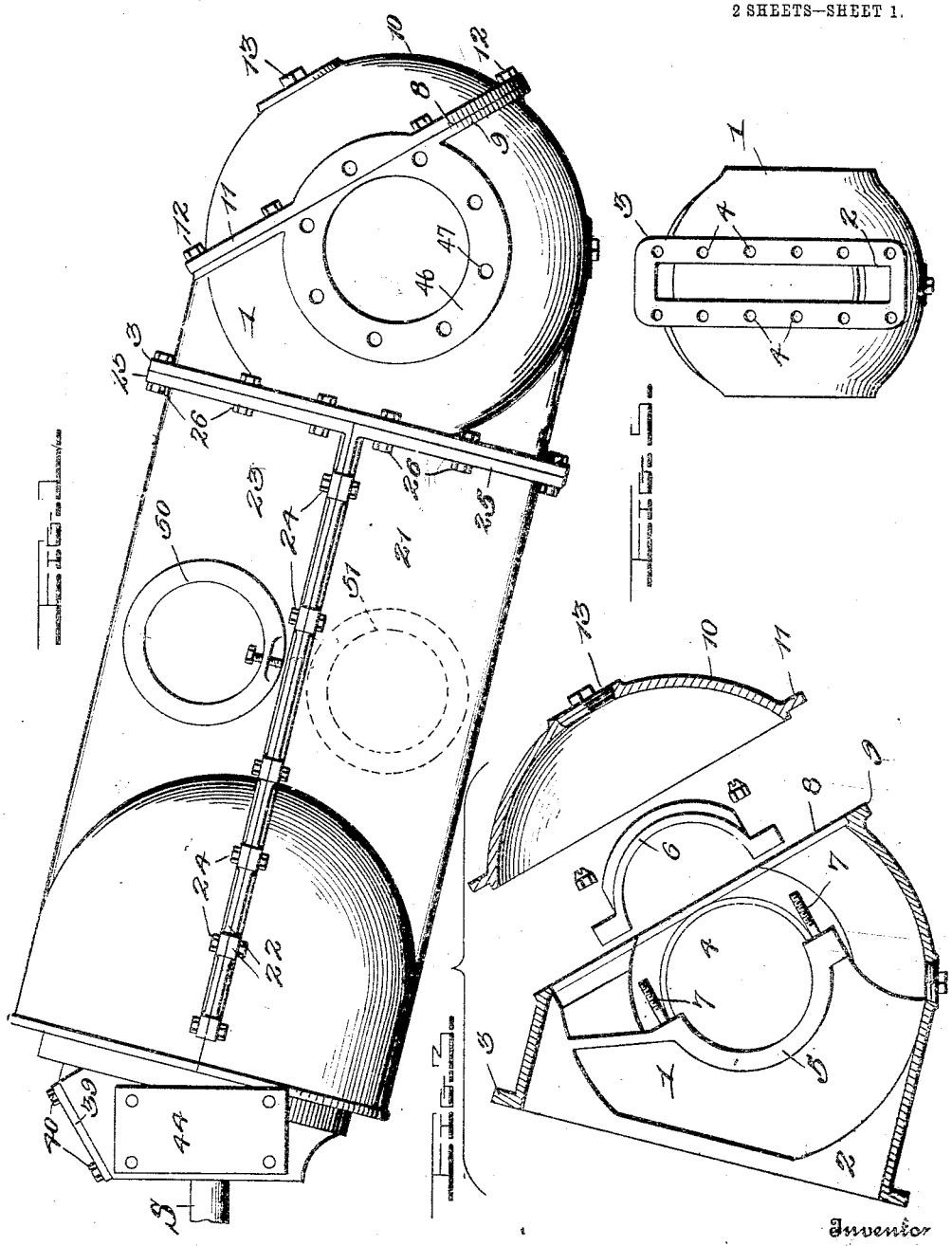
Witnesses
Chas. L. Griesbauer.
J. Ralph Hogg
Inventor
Elmer F. Altman,
By H. A. Wilson & Co.
Attorneys

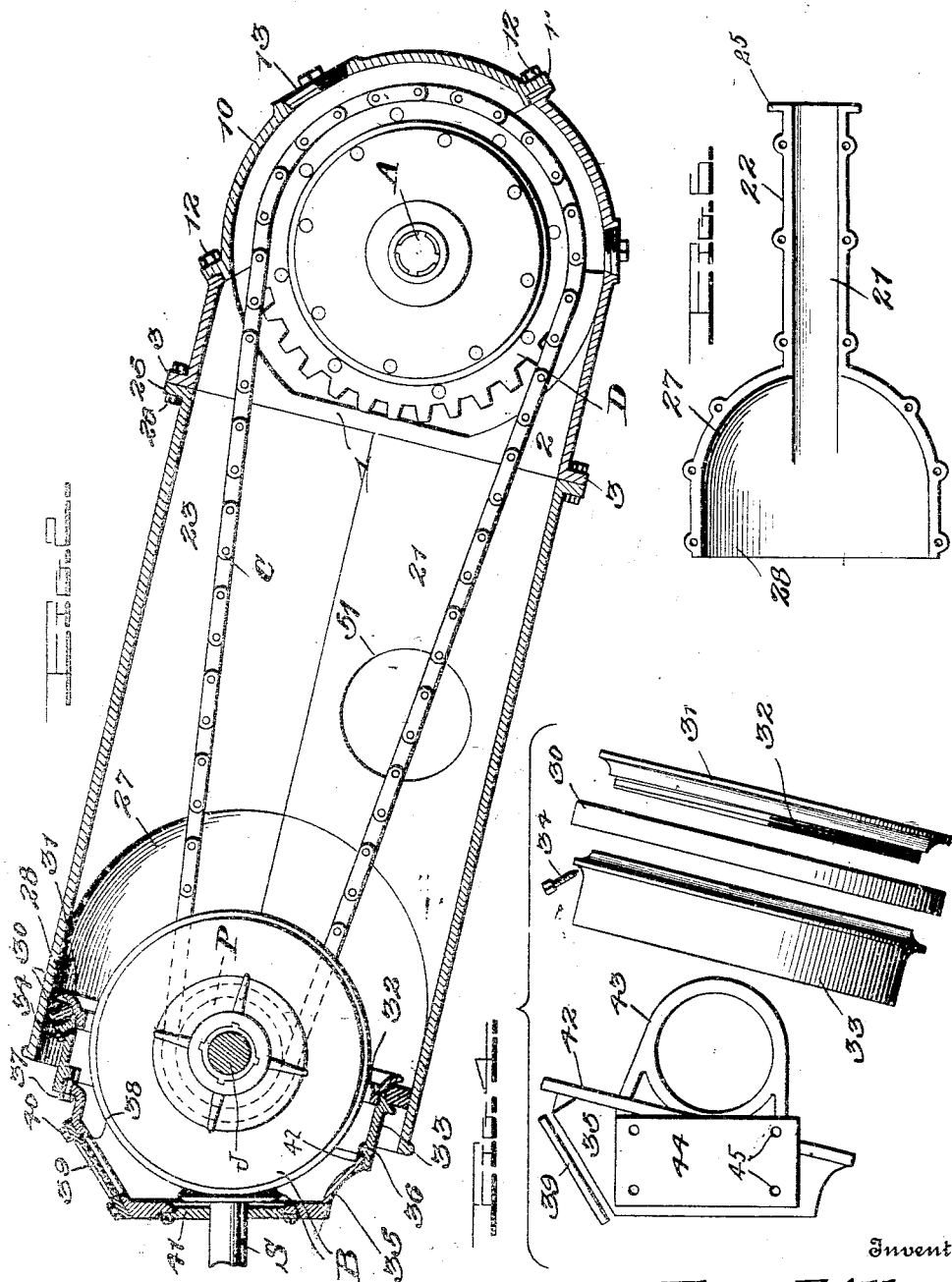

UNITED STATES PATENT OFFICE.

ELMER F. ALTMAN, OF MINNEAPOLIS, MINNESOTA.

SPROCKET-CHAIN HOUSING.

1,113,148.  Specification of Letters Patent.  Patented Oct. 6, 1914.

Application filed July 24, 1913. Serial No. 781,012.

*To all whom it may concern:*

Be it known that I, ELMER F. ALTMAN, a citizen of the United States, residing at Minneapolis, in the county of Hennepin and State of Minnesota, have invented certain new and useful Improvements in Sprocket-Chain Housings; and I do declare the following to be a full, clear, and exact description of the invention, such as will enable others skilled in the art to which it appertains to make and use the same.

This invention relates to machine elements, and more especially to sprocket gears; and the object of the same is to produce an improved housing or case which will cover both sprocket wheels and the chain that connects them and will inclose all parts in an oil-tight manner while yet permitting adjustments and a certain degree of flexibility. This object is accomplished by the construction hereinafter more fully described and claimed and as shown in the drawings wherein—

Figure 1 is a side elevation of this housing complete. Fig. 2 is a central longitudinal sectional view with the gears and chain in place. Fig. 3 is an enlarged longitudinal sectional view of the driven-sprocket member of this housing, with its parts slightly separated. Fig. 4 is a side elevation of certain parts of that member which surrounds the power-sprocket, said parts being slightly separated. Fig. 5 is a front elevation of the rear member. Fig. 6 is a plan view of the lower part of the intermediate or chain member.

In the drawings I have shown this housing as having its members and the parts thereof connected around the driving mechanism of a chain-driven automobile, and the letter S designates the power shaft thereof connected by bevel gears B with a jack shaft J carrying the power sprocket P. Said sprocket is connected by a chain C with the driven sprocket D, the latter being attached directly or through the instrumentality of differential mechanism (not shown) with the rear axle A in a manner well understood in this art.

The purpose of the present invention is to exclude dust and dirt and to retain oil and grease, while yet permitting a certain flexibility as necessitated when the rear axle rises and falls with respect to the automobile framework.

Coming now to the present invention, the housing as a whole is made in three members whereof one surrounds the driven sprocket D, another the chain, and the third the power sprocket P; and each member is made in parts which may be easily cast or formed, assembled readily, and taken apart when necessary. The driven-sprocket member is composed of a substantially globular body 1 whose front end is flattened laterally as at 2 and provided with radial flanges 3, whose sides are pierced with openings 4 surrounded by two-part bearings 5 and 6 connected by screws or bolts 7 so that they may be separated when desired; and whose rear portion is cut off on an oblique line 8 and surrounded by a flange 9—thereby producing a large inspection opening as seen in Fig. 3. Over this opening fits a dome-shaped cap 10 having a surrounding flange 11 which may be bolted or screwed at 12 to the flange 9 of the body 1 in any suitable way, and this cap itself may have an opening closed by a plug 13 for removal when the user desires to see the differential without reaching or removing the parts.

The chain-inclosing member is made up of upper and lower duplicated parts of which a plan view of the lowermost is seen in Fig. 6. This comprises a narrow body 21 having side flanges 22 for connection with similar flanges on the upper part 23 of said body by means of screws or bolts 24, and also having a flange 25 around its rear end for connection by means of screws or bolts 26 with the flange 3 around the front end of the rear member; and the front ends of both parts 21 and 23 are enlarged laterally into a cup-shaped structure 27 having a bell mouth 28.

The power-sprocket member is made up of several parts. Slidably mounted within said bell mouth 28 is a packing ring 30 disposed in a groove which is formed by connecting the members shown at the right of Fig. 4. An annulus 31 has a half-groove on its outer face and its smaller end is reduced and threaded as at 32; a band 33 is formed at one end with the other half-groove on its outer face and is internally threaded to receive the threaded portion 32; and when these parts are screwed together as seen in Fig. 2, they are held from unscrewing by inserting a set screw 34. The parts thus far described are connected with the body portion 35 of this member by an engaging shoulder 36 and a screw or bolt 37, and said body has a suitable opening for the passage of the shaft S and at its upper corner an inspection opening 38 closed by a cap plate 39 removably held thereon in any suitable manner, as by screws or bolts 40. In the opening around the shaft S is packing 41 of any suitable type in order to prevent dirt from entering this portion of the housing. At the rear portion of this part 35 is a ring 42 for attachment to the band 33 in the manner above described, and from said ring project two eyes 43 for the bearings (not shown) in which is journaled the jack shaft J of the power sprocket P and the bevel gear which is driven by the power gear on shaft S. This separation of the members 42 and 33 is obviously for the purpose of permitting the machining of parts. The forward portion of the body part 35 also by preference has side plates 44 pierced with bolt- or screw-holes 45 by means of which this member of the housing may be attached to some support beneath the automobile frame. I may here add that the sides of the rear or drive-sprocket member are also by preference provided with plates or rings 46 pierced with bolt-holes 47 so that the rear-axle casings may be attached thereto, although this feature forms no part of the present invention, nor does the specific mode of mounting the front member beneath the automobile framework. Thus is built up a housing for the driving and driven gears and the chain of a chain-drive connection between the power shaft S and the rear axle A of an automobile; and all parts are assembled as best seen in Fig. 2. As the rear axle rises and falls with reference to the automobile frame, as the rear springs permit and the inequalities of the roadway necessitate, the rear member of the housing and the chain member thereof will partake of this movement while the forward member remains fixed as it is rigidly bolted or screwed to the frame. The result is that there must be a certain flexibility where the chain member surrounds the front member, and this is permitted by reason of the packing 30 fitting closely but loosely within the bell mouth 28 of the chain member. When the distance between the axle A and the jack shaft is adjusted to tighten the chain, the packing ring 30 will slide within said bell mouth. Yet it will ever maintain a grease-tight and dust-tight connection therewith, so that no oil or grease within the housing can escape and no dust or dirt on the exterior can enter.

Access to the rear member may be had through the opening closed by the plug 13, or access to its interior when the parts are to be repaired or removed may be had by removing the entire cap 10. Access to the front member may be had by removing the cap plate 39. The parts of the intermediate member may be provided with openings closed by suitable covers 50 and 51, and when the latter are removed the interior of this member of the housing can be inspected; but when it is desired to gain access to the interior as for repairing a broken link of the chain, the upper part 23 can be entirely removed from the lower part 21 by disconnecting the bolts or screws 24 along both sides and the bolts or screws 26 through its rear flange and then lifting the part 23 out of place. At this time access may be had to the set screw 34, and when the same is loosened the annulus 31 may be withdrawn and the packing ring 30 replaced in case it has become worn. In fact, the removal of the upper part 23 of the intermediate member gives access to the adjacent ends of both the other members.

The parts are all of the desired materials and proportions, and changes in details may be made without departing from the principle of my invention.

What is claimed as new is:

1. In a sprocket housing of the class described, the combination with a chain member having a bell mouth; of a sprocket member comprising a band slidably fitting within said mouth, a body portion having a ring detachably connected with said band, and eyes projecting from said body portion for the purpose set forth.

2. In a sprocket housing of the class described, the combination with a chain member having a bell mouth; of a gear member comprising a band slidably mounted in said mouth, a body portion having a ring, a shoulder within the band which said ring fits, means for holding these parts connected, an inspection opening being provided in the body portion, means for removably closing this opening, and a pair of eyes projecting from the body portion.

3. The herein described sprocket housing comprising a substantially globular body cut off by an oblique plane at its rear end and provided with an opening in said plane and with flanges around said opening, and flattened at its front end and cut off by a substantially vertical plane in which it is also provided with flanges, the side walls of said body portion having openings surrounded by flanges for attachment to the axle casings, two-part bearings within said latter openings, a cap for closing the open rear portion of said body, the cap being surrounded by a flange and pierced with an opening, bolts passing through this flange and through that in said oblique plane, a plug movably closing said rear opening, and a chain member detachably connected with the other flange.

4. The herein described chain and sprocket housing, the same comprising a power-sprocket member consisting of a body portion, shaft bearings therein, a band detachably connected with said portion and having an annular groove, and packing within said groove; a chain member made in two parts having meeting flanges along their sides and radial flanges at their rear ends, each part being pierced with an inspection opening, and plates removably closing said openings, the front end of said chain-member having a bell mouth slidably inclosing said packing; and a driven-sprocket member consisting of a body portion having an opening in its front end, a flange around this opening detachably connected with the flange at the rear end of the chain member, said driven sprocket member also having openings through its sides for the passage of the driven axle and an opening at its rear, a cap removably closing the last-named opening and itself having an opening, and a removable plug closing the opening in the cap.

5. In a sprocket housing for the chain drive of automobiles, the combination with the driving shaft, jack shaft at right angles thereto, power gear and power sprocket on the jack shaft, rear axle, driven sprocket thereon, and chain connecting said sprockets; of a chain member having a bell mouth at its front end, a driven-sprocket member adapted to be connected with the rear-axle housing, connections between said members; a power-sprocket member comprising a band sliding in said bell-mouth and surrounded with packing, a body inclosing the power gear and jack shaft and having eyes for the bearings of the jack shaft whereby this member is centered on said jack shaft irrespective of the movements of the other members.

6. In a sprocket housing for the chain-drive of automobiles, the combination with the driving shaft, jack shaft at right angles thereto, power sprocket on the jack shaft, rear axle, driven sprocket thereon, and chain connecting said sprockets; of a power-sprocket housing-member inclosing the driving mechanism and driving end of the chain and having supports for the jack shaft bearings whereby this member is centered around the jack shaft, a driven-sprocket member connected with the rear axle housing and centered around the driven sprocket, a chain member adapted to be connected with the rear axle housing and inclosing the chain, and telescopic connections between this member and the power-sprocket member whereby such members telescope with each other on a line passing through the jack shaft so that the rear end of the entire housing moves on the same radius as the rear end of the chain.

In testimony whereof I have hereunto set my hand in presence of two subscribing witnesses.

ELMER F. ALTMAN.

Witnesses:
ORIN M. OULMAN,
ANDREW J. PETERSON.